US012578895B2

(12) United States Patent
Pydipaty et al.

(10) Patent No.: US 12,578,895 B2
(45) Date of Patent: *Mar. 17, 2026

(54) USING NETWORK DEVICE REPLICATION IN DISTRIBUTED STORAGE CLUSTERS

(71) Applicant: Cisco Technology, Inc., San Jose, CA (US)

(72) Inventors: Ramdoot Kumar Pydipaty, Bangalore (IN); Amit Kumar Saha, Bangalore (IN); Arun Saha, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1086 days.

This patent is subject to a terminal disclaimer.

(21) Appl. No.: 17/119,797

(22) Filed: Dec. 11, 2020

(65) Prior Publication Data

US 2021/0173564 A1 Jun. 10, 2021

Related U.S. Application Data

(63) Continuation of application No. 15/783,229, filed on Oct. 13, 2017, now Pat. No. 10,942,666.

(51) Int. Cl.
*G06F 3/06* (2006.01)
*G06F 16/27* (2019.01)
(Continued)

(52) U.S. Cl.
CPC .............. *G06F 3/065* (2013.01); *G06F 3/067* (2013.01); *G06F 16/275* (2019.01);
(Continued)

(58) Field of Classification Search
CPC ........ G06F 3/065; G06F 3/067; G06F 3/0611; H04L 67/1095; H04L 12/185; H04L 12/1845; H04L 12/184
See application file for complete search history.

(56) References Cited

U.S. PATENT DOCUMENTS

| | | | |
|---|---|---|---|
| 4,688,695 A | 8/1987 | Hirohata | |
| 5,263,003 A | 11/1993 | Cowles et al. | |

(Continued)

FOREIGN PATENT DOCUMENTS

| | | | |
|---|---|---|---|
| EP | 2228719 | 9/2010 | |
| EP | 2439637 | 4/2012 | |

(Continued)

OTHER PUBLICATIONS

Fenner et al., Protocol Independent Multicast—Sparse Mode (PIM-SM): Protocol Specification (Revised), IETF, Mar. 2016, pp. 1-119.
(Continued)

*Primary Examiner* — Anh Nguyen
(74) *Attorney, Agent, or Firm* — Polsinelli P.C.

(57) ABSTRACT
Systems, methods, and computer-readable media for replicating data in a distributed storage cluster using an underlying network. In some examples, a primary node of a placement group in a network overlay of a distributed storage cluster can receive data for replication in the placement group. The primary node can provide the data to a first slave node of a plurality of slave nodes within the placement group in an underlying network of the distributed storage cluster. The data can subsequently be replicated using the underlying network by providing the data to at least one other slave node of the plurality of slave nodes within the placement group in the underlying network directly from the first slave node in the underlying network.

20 Claims, 10 Drawing Sheets

(51) Int. Cl.
    *H04L 67/1097*     (2022.01)
    *G06F 11/20*     (2006.01)
    *H04L 67/10*     (2022.01)
    *H04L 67/1095*     (2022.01)

(52) U.S. Cl.
    CPC ...... *H04L 67/1097* (2013.01); *G06F 11/2056*
    (2013.01); *H04L 67/10* (2013.01); *H04L*
    *67/1095* (2013.01)

(56) References Cited

U.S. PATENT DOCUMENTS

| | | | |
|---|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,190,686 B1 | 3/2007 | Beals |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |

(56) References Cited

U.S. PATENT DOCUMENTS

| | | | |
|---|---|---|---|
| 8,335,231 | B2 | 12/2012 | Kloth et al. |
| 8,341,121 | B1 | 12/2012 | Claudatos et al. |
| 8,345,692 | B2 | 1/2013 | Smith |
| 8,352,941 | B1 | 1/2013 | Protopopov et al. |
| 8,392,760 | B2 | 3/2013 | Kandula et al. |
| 8,442,059 | B1 | 5/2013 | de la Iglesia et al. |
| 8,479,211 | B1 | 7/2013 | Marshall et al. |
| 8,495,356 | B2 | 7/2013 | Ashok et al. |
| 8,514,868 | B2 | 8/2013 | Hill |
| 8,532,108 | B2 | 9/2013 | Li et al. |
| 8,560,663 | B2 | 10/2013 | Baucke et al. |
| 8,619,599 | B1 | 12/2013 | Even |
| 8,626,891 | B2 | 1/2014 | Guru et al. |
| 8,630,983 | B2 | 1/2014 | Sengupta et al. |
| 8,660,129 | B1 | 2/2014 | Brendel et al. |
| 8,661,299 | B1 | 2/2014 | Ip |
| 8,677,485 | B2 | 3/2014 | Sharma et al. |
| 8,683,296 | B2 | 3/2014 | Anderson et al. |
| 8,706,772 | B2 | 4/2014 | Hartig et al. |
| 8,719,804 | B2 | 5/2014 | Jain |
| 8,725,854 | B2 | 5/2014 | Edsall |
| 8,768,981 | B1 | 7/2014 | Milne et al. |
| 8,775,773 | B2 | 7/2014 | Acharya et al. |
| 8,793,372 | B2 | 7/2014 | Ashok et al. |
| 8,805,918 | B1 | 8/2014 | Chandrasekaran et al. |
| 8,805,951 | B1 | 8/2014 | Faibish et al. |
| 8,832,330 | B1 | 9/2014 | Lancaster |
| 8,855,116 | B2 | 10/2014 | Rosset et al. |
| 8,856,339 | B2 | 10/2014 | Mestery et al. |
| 8,868,474 | B2 | 10/2014 | Leung et al. |
| 8,887,286 | B2 | 11/2014 | Dupont et al. |
| 8,898,385 | B2 | 11/2014 | Jayaraman et al. |
| 8,909,928 | B2 | 12/2014 | Ahmad et al. |
| 8,918,510 | B2 | 12/2014 | Gmach et al. |
| 8,918,586 | B1 | 12/2014 | Todd et al. |
| 8,924,720 | B2 | 12/2014 | Raghuram et al. |
| 8,930,747 | B2 | 1/2015 | Levijarvi et al. |
| 8,935,500 | B1 | 1/2015 | Gulati et al. |
| 8,949,677 | B1 | 2/2015 | Brundage et al. |
| 8,996,837 | B1 | 3/2015 | Bono et al. |
| 9,003,086 | B1 | 4/2015 | Schuller et al. |
| 9,007,922 | B1 | 4/2015 | Mittal et al. |
| 9,009,427 | B2 | 4/2015 | Sharma et al. |
| 9,009,704 | B2 | 4/2015 | McGrath et al. |
| 9,075,638 | B2 | 7/2015 | Barnett et al. |
| 9,141,554 | B1 | 9/2015 | Candelaria |
| 9,141,785 | B2 | 9/2015 | Mukkara et al. |
| 9,164,795 | B1 | 10/2015 | Vincent |
| 9,176,677 | B1 | 11/2015 | Fradkin et al. |
| 9,201,704 | B2 | 12/2015 | Chang et al. |
| 9,203,784 | B2 | 12/2015 | Chang et al. |
| 9,207,882 | B2 | 12/2015 | Rosset et al. |
| 9,207,929 | B2 | 12/2015 | Katsura |
| 9,213,612 | B2 | 12/2015 | Candelaria |
| 9,223,564 | B2 | 12/2015 | Munireddy et al. |
| 9,223,634 | B2 | 12/2015 | Chang et al. |
| 9,244,761 | B2 | 1/2016 | Yekhanin et al. |
| 9,250,969 | B2 | 2/2016 | Lager-Cavilla et al. |
| 9,264,494 | B2 | 2/2016 | Factor et al. |
| 9,270,754 | B2 | 2/2016 | Iyengar et al. |
| 9,280,487 | B2 | 3/2016 | Candelaria |
| 9,304,815 | B1 | 4/2016 | Vasanth et al. |
| 9,313,048 | B2 | 4/2016 | Chang et al. |
| 9,374,270 | B2 | 6/2016 | Nakil et al. |
| 9,378,060 | B2 | 6/2016 | Jansson et al. |
| 9,396,251 | B1 | 7/2016 | Boudreau et al. |
| 9,448,877 | B2 | 9/2016 | Candelaria |
| 9,471,348 | B2 | 10/2016 | Zuo et al. |
| 9,501,473 | B1 | 11/2016 | Kong et al. |
| 9,503,523 | B2 | 11/2016 | Rosset et al. |
| 9,565,110 | B2 | 2/2017 | Mullendore et al. |
| 9,575,828 | B2 | 2/2017 | Agarwal et al. |
| 9,582,377 | B1 | 2/2017 | Dhoolam et al. |
| 9,614,763 | B2 | 4/2017 | Dong et al. |
| 9,658,868 | B2 | 5/2017 | Hill |
| 9,658,876 | B2 | 5/2017 | Chang et al. |
| 9,660,898 | B2 * | 5/2017 | Peter ....................... H04L 45/16 |
| 9,733,868 | B2 | 8/2017 | Chandrasekaran et al. |
| 9,763,518 | B2 | 9/2017 | Charest et al. |
| 9,830,240 | B2 | 11/2017 | George et al. |
| 9,853,873 | B2 | 12/2017 | Dasu et al. |
| 10,243,864 | B1 | 3/2019 | Jorgovanovic et al. |
| 2002/0049980 | A1 | 4/2002 | Hoang |
| 2002/0053009 | A1 | 5/2002 | Selkirk et al. |
| 2002/0073276 | A1 | 6/2002 | Howard et al. |
| 2002/0083120 | A1 | 6/2002 | Soltis |
| 2002/0095547 | A1 | 7/2002 | Watanabe et al. |
| 2002/0103889 | A1 | 8/2002 | Markson et al. |
| 2002/0103943 | A1 | 8/2002 | Lo et al. |
| 2002/0112113 | A1 | 8/2002 | Karpoff et al. |
| 2002/0120741 | A1 | 8/2002 | Webb et al. |
| 2002/0138675 | A1 | 9/2002 | Mann |
| 2002/0156971 | A1 | 10/2002 | Jones et al. |
| 2003/0023885 | A1 | 1/2003 | Potter et al. |
| 2003/0026267 | A1 | 2/2003 | Oberman et al. |
| 2003/0055933 | A1 | 3/2003 | Ishizaki et al. |
| 2003/0056126 | A1 | 3/2003 | O'Connor et al. |
| 2003/0065986 | A1 | 4/2003 | Fraenkel et al. |
| 2003/0084359 | A1 | 5/2003 | Bresniker et al. |
| 2003/0118053 | A1 | 6/2003 | Edsall et al. |
| 2003/0131105 | A1 | 7/2003 | Czeiger et al. |
| 2003/0131165 | A1 | 7/2003 | Asano et al. |
| 2003/0131182 | A1 | 7/2003 | Kumar et al. |
| 2003/0140134 | A1 | 7/2003 | Swanson et al. |
| 2003/0140210 | A1 | 7/2003 | Testardi |
| 2003/0149763 | A1 | 8/2003 | Heitman et al. |
| 2003/0154271 | A1 | 8/2003 | Baldwin et al. |
| 2003/0159058 | A1 | 8/2003 | Eguchi et al. |
| 2003/0174725 | A1 | 9/2003 | Shankar |
| 2003/0189395 | A1 | 10/2003 | Doornbos et al. |
| 2003/0210686 | A1 | 11/2003 | Terrell et al. |
| 2004/0024961 | A1 | 2/2004 | Cochran et al. |
| 2004/0030857 | A1 | 2/2004 | Krakirian et al. |
| 2004/0039939 | A1 | 2/2004 | Cox et al. |
| 2004/0054776 | A1 | 3/2004 | Klotz et al. |
| 2004/0057389 | A1 | 3/2004 | Klotz et al. |
| 2004/0059807 | A1 | 3/2004 | Klotz et al. |
| 2004/0088574 | A1 | 5/2004 | Walter et al. |
| 2004/0117438 | A1 | 6/2004 | Considine et al. |
| 2004/0123029 | A1 | 6/2004 | Dalai et al. |
| 2004/0128470 | A1 | 7/2004 | Hetzler et al. |
| 2004/0128540 | A1 | 7/2004 | Roskind |
| 2004/0153863 | A1 | 8/2004 | Klotz et al. |
| 2004/0190901 | A1 | 9/2004 | Fang |
| 2004/0215749 | A1 | 10/2004 | Tsao |
| 2004/0230848 | A1 | 11/2004 | Mayo et al. |
| 2004/0250034 | A1 | 12/2004 | Yagawa et al. |
| 2005/0033936 | A1 | 2/2005 | Nakano et al. |
| 2005/0036499 | A1 | 2/2005 | Dutt et al. |
| 2005/0050211 | A1 | 3/2005 | Kaul et al. |
| 2005/0050270 | A1 | 3/2005 | Horn et al. |
| 2005/0053073 | A1 | 3/2005 | Kloth et al. |
| 2005/0055428 | A1 | 3/2005 | Terai et al. |
| 2005/0060574 | A1 | 3/2005 | Klotz et al. |
| 2005/0060598 | A1 | 3/2005 | Klotz et al. |
| 2005/0071851 | A1 | 3/2005 | Opheim |
| 2005/0076113 | A1 | 4/2005 | Klotz et al. |
| 2005/0091426 | A1 | 4/2005 | Horn et al. |
| 2005/0114611 | A1 | 5/2005 | Durham et al. |
| 2005/0114615 | A1 | 5/2005 | Ogasawara et al. |
| 2005/0117522 | A1 | 6/2005 | Basavaiah et al. |
| 2005/0117562 | A1 | 6/2005 | Wrenn |
| 2005/0138287 | A1 | 6/2005 | Ogasawara et al. |
| 2005/0169188 | A1 | 8/2005 | Cometto et al. |
| 2005/0185597 | A1 | 8/2005 | Le et al. |
| 2005/0188170 | A1 | 8/2005 | Yamamoto |
| 2005/0198523 | A1 | 9/2005 | Shanbhag et al. |
| 2005/0235072 | A1 | 10/2005 | Smith et al. |
| 2005/0283658 | A1 | 12/2005 | Clark et al. |
| 2006/0015861 | A1 | 1/2006 | Takata et al. |
| 2006/0015928 | A1 | 1/2006 | Setty et al. |
| 2006/0034302 | A1 | 2/2006 | Peterson |
| 2006/0045021 | A1 | 3/2006 | Deragon et al. |
| 2006/0075191 | A1 | 4/2006 | Lolayekar et al. |

(56)        References Cited

U.S. PATENT DOCUMENTS

| | | |
|---|---|---|
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2008/0304588 A1 | 12/2008 | Pi |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299529 A1 | 12/2011 | Olsson et al. |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0155463 A1 | 6/2012 | Vasseur et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0233326 A1 | 9/2012 | Shaffer et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0132501 A1 | 5/2013 | Vandwalle et al. |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0144973 A1 | 6/2013 | Li et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |

(56)                References Cited

U.S. PATENT DOCUMENTS

| | | |
|---|---|---|
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0089619 A1 | 3/2014 | Khanna et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0122741 A1 | 5/2014 | Thubert et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0205974 A1 | 7/2015 | Talley et al. |
| 2015/0207763 A1 | 7/2015 | Bertran Ortiz et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |
| 2018/0159781 A1 | 6/2018 | Mehta et al. |
| 2018/0183656 A1* | 6/2018 | Jones .................. H04W 24/04 |
| 2020/0177401 A1* | 6/2020 | Kebler .................. H04L 12/185 |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/2012/0725092619/http://blog.twinstrata.com/2012/07/10//5-benefits-of-a-storage-gateway-in-the-cloud.
Author Unknown, "Configuration Interface for IBM System Storage DS5000, IBM DS4000, and IBM DS3000 Systems," IBM SAN

(56)          References Cited

OTHER PUBLICATIONS

Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual Das (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, SAN Fabric Administration Best Practices Guide, Support Perspective," Brocade Communication Systems, Inc., May 2013, 21 pages.

Author Unknown, "delphi—Save a CRC value in a file, without altering the actual CRC Checksum?" Stack Overflow, stackoverflow. com, Dec. 23, 2011, XP055130879, 3 pages http://stackoverflow. com/questions/8608219/save-a-crc-value-in-a-file-wihout-altering-the-actual-crc-checksum.

Author Unknown, "EMC Unisphere: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emo.com/storage/vnx/ unisphere.htm.

Author Unknown, "HP XP Array Manager Software—Overview & Features," Storage Device Management Software; Hewlett-Packard Development Company, 3 pages; © 2013 Hewlett-Packard Development Company, L.P.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Network Transformation with Software-Defined Networking and Ethernet Fabrics," Positioning Paper, 2012, 6 pages, Brocade Communications Systems.

Author Unknown, "Recreating Real Application Traffic in Junosphere Lab," Solution Brief, Juniper Networks, Dec. 2011, 3 pages.

Author Unknown, "Shunra for HP Softwarer," Enabling Confidence in Application Performance Before Deployment, 2010, 2 pages.

Author Unknown, "Software Defined Networking: The New Norm for Networks," White Paper, Open Networking Foundation, Apr. 13, 2012, 12 pages.

Author Unknown, "Software Defined Storage Networks An Introduction," White Paper, Doc # 01-000030-001 Rev. A, Dec. 12, 2012, 8 pages; Jeda Networks, Newport Beach, California, U.S.A.

Author Unknown, "Standard RAID Levels," Wikipedia, the Free Encyclopedia, last updated Jul. 18, 2014, 7 pages; http://en.wikipedia. org/wiki/Standard RAID levels.

Author Unknown, "Storage Infrastructure for the Cloud," Solution Brief, © 2012, 3 pages; coraid, Redwood City, California, U.S.A.

Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.

Author Unknown, "The Fundamentals of Software-Defined Storage, Simplicity at Scale for Cloud-Architectures" Solution Brief, 2013, 3 pages; Coraid, Redwood City, California, U.S.A.

Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.

Author Unknown, "Xgig Analyzer: Quick Start Feature Guide 4.0," Feb. 2008, 24 pages, Finisar Corporation, Sunnyvale, California, U.S.A.

Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.

Author Unknown, "Vblock Solution for SAP: Simplified Provisioning for Operation Efficiency," VCE White Paper, VCE—The Virtual Computing Environment Company, Aug. 2011, 11 pages.

Aweya, James, et al., "Multi-level active queue management with dynamic thresholds," Elsevier, Computer Communications 25 (2002) pp. 756-771.

Berman, Stuart, et al., "Start-Up Jeda Networks in Software Defined Storage Network Technology," Press Release, Feb. 25, 2013, 2 pages, http://storagenewsletter.com/news/startups/jeda-networks.

Borovick, Lucinda, et al., "White Paper, Architecting the Network for the Cloud," IDC Analyze the Future, Jan. 2011, pp. 1-8.

Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.

Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.

Cisco Systems, Inc. "N-Port Virtualization in the Data Center," Cisco White Paper, Cisco Systems, Inc., Mar. 2008, 7 pages.

Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.

Cisco Systems, Inc., "Cisco Prime Data Center Network Manager 6.1," At-A-Glance, © 2012, 3 pages.

Cisco Systems, Inc., "Cisco Prime Data Center Network Manager," Release 6.1 Data Sheet, © 2012, 10 pages.

Cisco Systems, Inc., "Cisco Unified Network Services: Overcome Obstacles to Cloud-Ready Deployments," White Paper, Cisco Systems, Inc., Jan. 2011, 6 pages.

Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.

Cummings, Roger, et al., Fibre Channe—Fabric Generic Requirements (FC-FG), Dec. 4, 1996, 33 pages, American National Standards Institute, Inc., New York, New York, U.S.A.

Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.

Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.

Hatzieleftheriou, Andromachi, et al., "Host-side Filesystem Journaling for Durable Shared Storage," 13th USENIX Conference on File and Storage Technologies (FAST '15), Feb. 16-19, 2015, 9 pages; https ://www.usenix org/system/files/conference/fast15/fast15.paper-hatzieleftheriou.pdf.

Hedayat, K., et al., "A Two-Way Active Measurement Protocol (TWAMP)," Network Working Group, RFC 5357, Oct. 2008, 26 pages.

Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].

Hosterman, Cody, et al., "Using EMC Symmetrix Storage inVMware vSphere Environments," Version 8.0, EMC²Techbooks, EMC Corporation; published on or about Jul. 8, 2008, 314 pages; [Retrieved and printed Sep. 12, 2013].

Hu, Yuchong, et al., "Cooperative Recovery of Distributed Storage Systems from Multiple Losses with Network Coding," University of Science & Technology Of China, Feb. 2010, 9 pages.

Keogh, Eamonn, et al., "Dimensionality Reduction for Fast Similarity Search in Large Time Series Databases," KAIS Long Paper submitted May 16, 2000; 19 pages.

(56)                References Cited

OTHER PUBLICATIONS

Kolyshkin, Kirill, "Virtualization in Linux," Sep. 1, 2006, pp. 1-5.

Kovar, Joseph F., "Startup Jeda Networks Takes SDN Approach To Storage Networks," CRN Press Release, Feb. 22, 2013, 1 page, http://www.crn.com/240149244/printablearticle.htm.

Lampson, Butler, W., et al., "Crash Recovery in a Distributed Data Storage System," Jun. 1, 1979, 28 pages.

Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.

Lin, Jessica, "Finding Motifs in Time Series," SIGKDD'02 Jul. 23-26, 2002, 11 pages, Edmonton, Alberta, Canada.

Linthicum, David, "VM Import could be a game changer for hybrid clouds", InfoWorld, Dec. 23, 2010, 4 pages.

Long, Abraham Jr., "Modeling the Reliability of RAID Sets," Dell Power Solutions, May 2008, 4 pages.

Ma, AO, et al., "RAIDShield: Characterizing, Monitoring, and Proactively Protecting Against Disk Failures," FAST '15, 13th USENIX Conference on File and Storage Technologies, Feb. 16-19, 2015, 17 pages, Santa Clara, California, U.S.A.

Mahalingam, M., et al., "Virtual extensible Local Area Network (VXLAN): A Framework for Overlaying Virtualized Layer 2 Networks over Layer 3 Networks," Independent Submission, RFC 7348, Aug. 2014, 22 pages; http://www.hip.at/doc/rfc/rfc7348.html.

Mcquerry, Steve, "Cisco UCS M-Series Modular Servers for Cloud-Scale Workloads," White Paper, Cisco Systems, Inc., Sep. 2014, 11 pages.

Monia, Charles, et al., IFCP—A Protocol for Internet Fibre Channel Networking, draft-monia-ips-ifcp-00.txt, Dec. 12, 2000, 6 pages.

Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.

Muglia, Bob, "Decoding SDN," Jan. 14, 2013, Juniper Networks, pp. 1-7, http:/forums.juniper.net/5/The-New-Network/Decoding-SDN/ba-p/174651.

Murray, Joseph F., et al., "Machine Learning Methods for Predicting Failures in Hard Drives: A Multiple-Instance Application," Journal of Machine Learning Research 6 (2005), pp. 783-816; May 2005, 34 pages.

Nelson, Mark, "File Verification Using CRC," Dr. Dobb's Journal, May 1, 1992, pp. 1-18, XP055130883.

Pace, Alberto, "Technologies for Large Data Management in Scientific Computing," International Journal of Modern Physics C., vol. 25, No. 2, Feb. 2014, 72 pages.

Petersen, Chris, "Introducing Lightning: A flexible NVMe JBOF," Mar. 9, 2016, 6 pages.

Pinheiro, Eduardo, et al., "Failure Trends in a Large Disk Drive Population," FAST '07, 5th USENIX Conference on File and Storage Technologies, Feb. 13-16, 2007, 13 pages, San Jose, California, U.S.A.

Raginsky, Maxim, et al., "Sequential Anomaly Detection in the Presence of Noise and Limited Feedback," arXiv:0911.2904v4 [cs.LG] Mar. 13, 2012, 19 pages.

Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.

Sajassi, A., et al., "BGP MPLS Based Ethernet VPN," Network Working Group, Oct. 18, 2014, 52 pages.

Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.

Sajassi, Ali, et al., "Integrated Routing and Bridging in EVPN," L2VPN Workgroup, Nov. 11, 2014, 26 pages; http://tools.ietf.org/pdf/draft-jeff-bess-evon-inter-subnet-forwarding-00.pdf.

Schroeder, Bianca, et al., "Disk failures in the real world: What does an MTTF of 1,000,000 hours mean to you?" FAST '07: 5th USENIX Conference on File And Storage Technologies, Feb. 13-16, 2007, 16 pages, San Jose, California, U.S.A.

Shue, David, et al., "Performance Isolation and Fairness for Multi-Tenant Cloud Storage," USENIX Association, 10th USENIX Symposium on Operating Systems Design Implementation (OSDI '12), 2012, 14 pages; https://www.usenix.org/system/files/conference/osdi12/osdi12-final-215.pdf.

Staimer, Marc, "Inside Cisco Systems' Unified Computing System," Dragon Slayer Consulting, Jul. 2009, 5 pages.

Stamey, John, et al., "Client-Side Dynamic Metadata in Web 2.0," SIGDOC '07, Oct. 22-24, 2007, pp. 155-161.

Swami, Vijay, "Simplifying SAN Management for VMWare Boot from SAN, Utilizing Cisco UCS and Palo," posted May 31, 2011, 6 pages.

Tate, Jon, et al., "Introduction to Storage Area Networks and System Networking," Dec. 2017, 302 pages, ibm.com/redbooks.

Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.

Wang, Feng, et al. "OBFS: A File System for Object-Based Storage Devices," Storage System Research Center, MSST. vol. 4., Apr. 2004, 18 pages.

Weil, Sage A., "Ceph: Reliable, Scalable, and High-Performance Distributed Storage," Dec. 2007, 239 pages, University of California, Santa Cruz.

Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.

Weil, Sage A., et al. "Ceph: A Scalable, High-performance Distributed File System," Proceedings of the 7th symposium on Operating systems design and implementation. USENIX Association, Nov. 6, 2006, 14 pages.

Whetten, Brian, et al., An Overview of Reliable Multicast Transport Protocol II., Jan./Feb. 2000, pp. 37-47.

Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.

Xue, Chendi, et al. "A Standard framework for Ceph performance profiling with latency breakdown," CEPH, Jun. 30, 2015, 3 pages.

Zhou, Zihan, et al., "Stable Principal Component Pursuit," arXiv:1001.2363v1 [cs.IT], Jan. 14, 2010, 5 pages.

Zhu, Yunfeng, et al., "A Cost-based Heterogeneous Recovery Scheme for Distributed Storage Systems with RAID-6 Codes," University of Science & Technology Of China, 2012, 12 pages.

* cited by examiner

300

Primary
Node
302

Slave Node
306

Slave Node
308

Slave Node
310

Underlying Network
304

FIG. 4
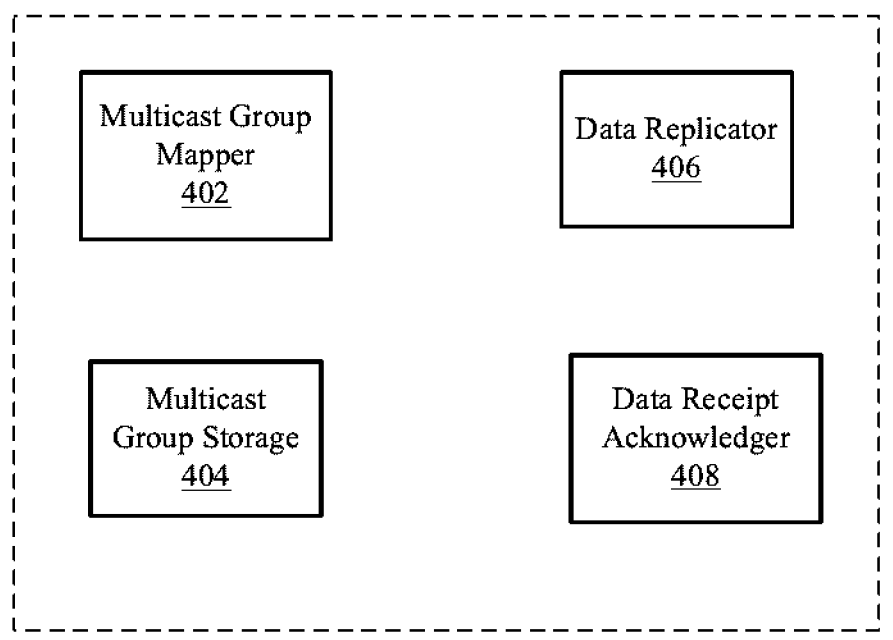

FIG. 5

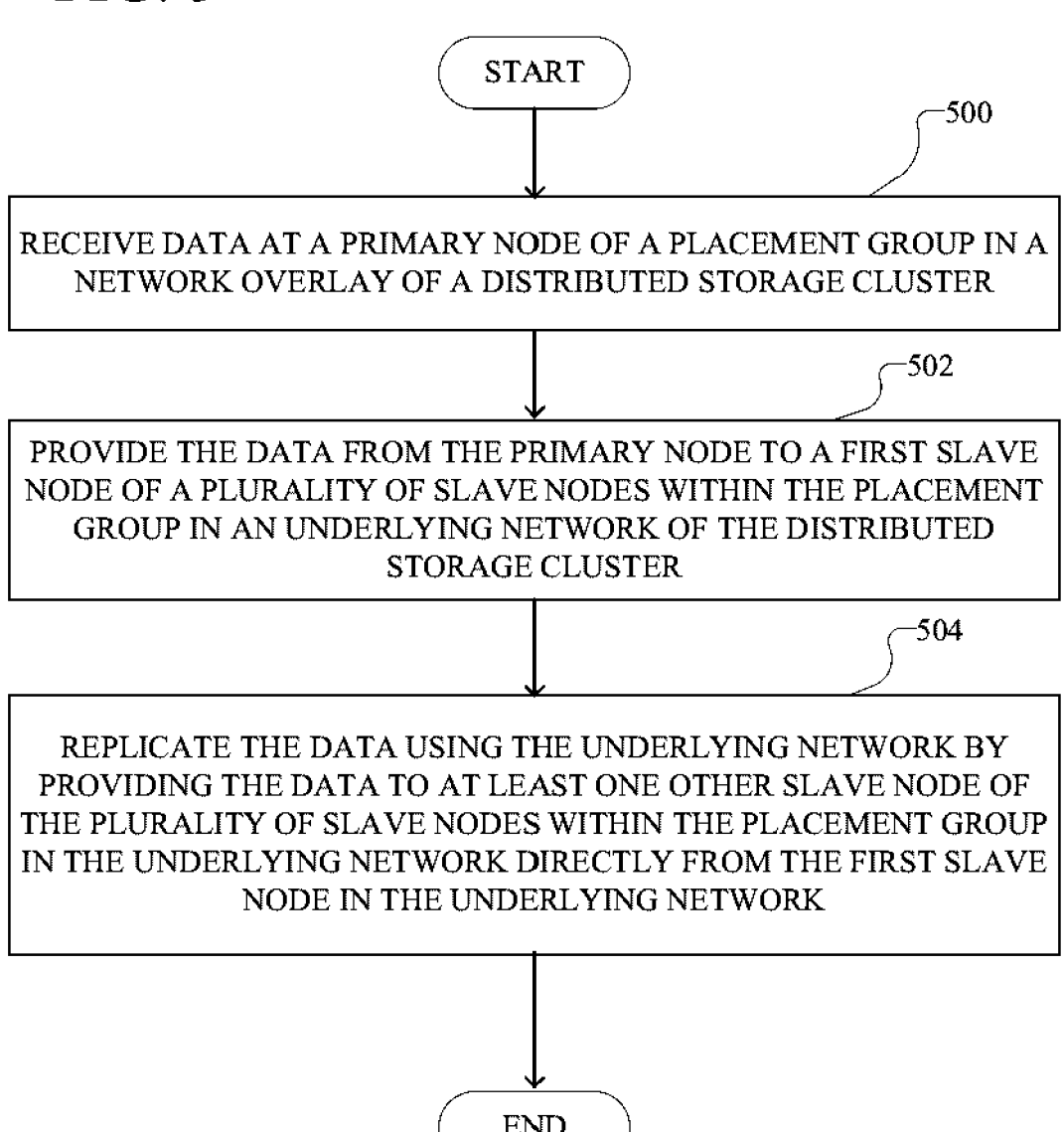

START

500

RECEIVE DATA AT A PRIMARY NODE OF A PLACEMENT GROUP IN A NETWORK OVERLAY OF A DISTRIBUTED STORAGE CLUSTER

502

PROVIDE THE DATA FROM THE PRIMARY NODE TO A FIRST SLAVE NODE OF A PLURALITY OF SLAVE NODES WITHIN THE PLACEMENT GROUP IN AN UNDERLYING NETWORK OF THE DISTRIBUTED STORAGE CLUSTER

504

REPLICATE THE DATA USING THE UNDERLYING NETWORK BY PROVIDING THE DATA TO AT LEAST ONE OTHER SLAVE NODE OF THE PLURALITY OF SLAVE NODES WITHIN THE PLACEMENT GROUP IN THE UNDERLYING NETWORK DIRECTLY FROM THE FIRST SLAVE NODE IN THE UNDERLYING NETWORK

END

FIG. 6

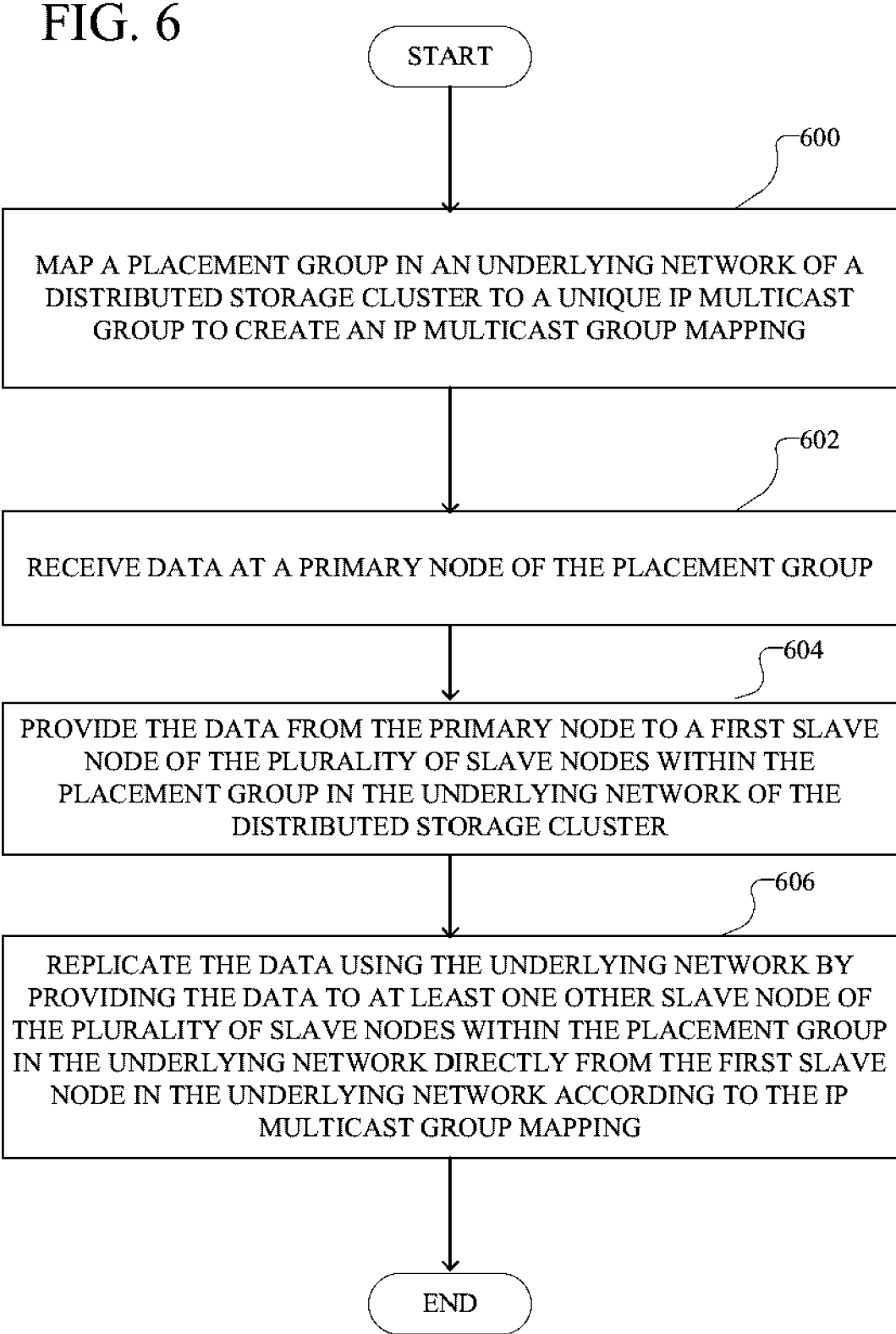

START

—600

MAP A PLACEMENT GROUP IN AN UNDERLYING NETWORK OF A DISTRIBUTED STORAGE CLUSTER TO A UNIQUE IP MULTICAST GROUP TO CREATE AN IP MULTICAST GROUP MAPPING

—602

RECEIVE DATA AT A PRIMARY NODE OF THE PLACEMENT GROUP

—604

PROVIDE THE DATA FROM THE PRIMARY NODE TO A FIRST SLAVE NODE OF THE PLURALITY OF SLAVE NODES WITHIN THE PLACEMENT GROUP IN THE UNDERLYING NETWORK OF THE DISTRIBUTED STORAGE CLUSTER

—606

REPLICATE THE DATA USING THE UNDERLYING NETWORK BY PROVIDING THE DATA TO AT LEAST ONE OTHER SLAVE NODE OF THE PLURALITY OF SLAVE NODES WITHIN THE PLACEMENT GROUP IN THE UNDERLYING NETWORK DIRECTLY FROM THE FIRST SLAVE NODE IN THE UNDERLYING NETWORK ACCORDING TO THE IP MULTICAST GROUP MAPPING

END

FIG. 8
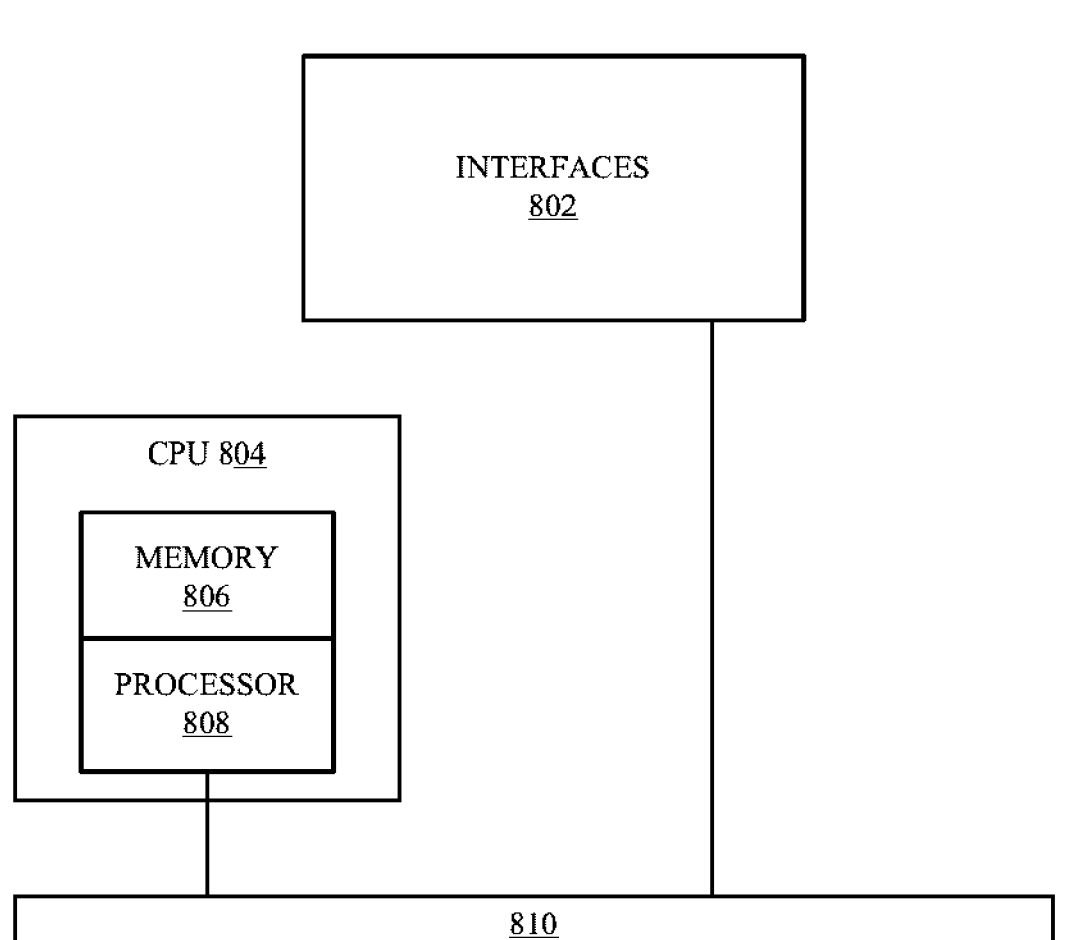

USING NETWORK DEVICE REPLICATION IN DISTRIBUTED STORAGE CLUSTERS

CROSS-REFERENCE TO RELATED APPLICATIONS

This application is a continuation of U.S. application Ser. No. 15/783,229, filed on Oct. 13, 2017, the content of which is incorporated herein by reference in its entirety.

TECHNICAL FIELD

The present technology pertains to distributed storage, and in particular to data replication within a distributed storage cluster of a distributed storage system.

BACKGROUND

Currently, replication of data in storage clusters is performed by a network overlay through source-based replication. In using source-based replication to replicate data, a primary node within a storage cluster coordinates with different nodes in the cluster in order to replicate data within the cluster. A primary node within a storage cluster can communicate with each node in a cluster using unicast in order to coordinate data replication within the cluster. Specifically, a primary node can send the data to each node individually through unicast transmissions. Each node can then send back to the primary node an acknowledgement indicating receipt of the data to the primary node. Using a primary node as the sole node within a cluster for coordinating data replication within the cluster is inefficient. Specifically, using only a primary node to coordinate data replication as part of source-based replication is slow and utilizes larger amounts of resources as communication occurs as the primary node has to communicate with each node individually.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 depicts an example underlying network-based data replication system;

FIG. 5 illustrates a flowchart for an example method of replicating data in a placement group of a distributed storage system using an underlying network of the distributed storage system;

FIG. 6 illustrates a flowchart for an example method of replicating data in a placement group of a distributed storage system through multicast messaging using an underlying network of the distributed storage system;

FIG. 8 illustrates an example network device.

DESCRIPTION OF EXAMPLE EMBODIMENTS

Figure 1A:
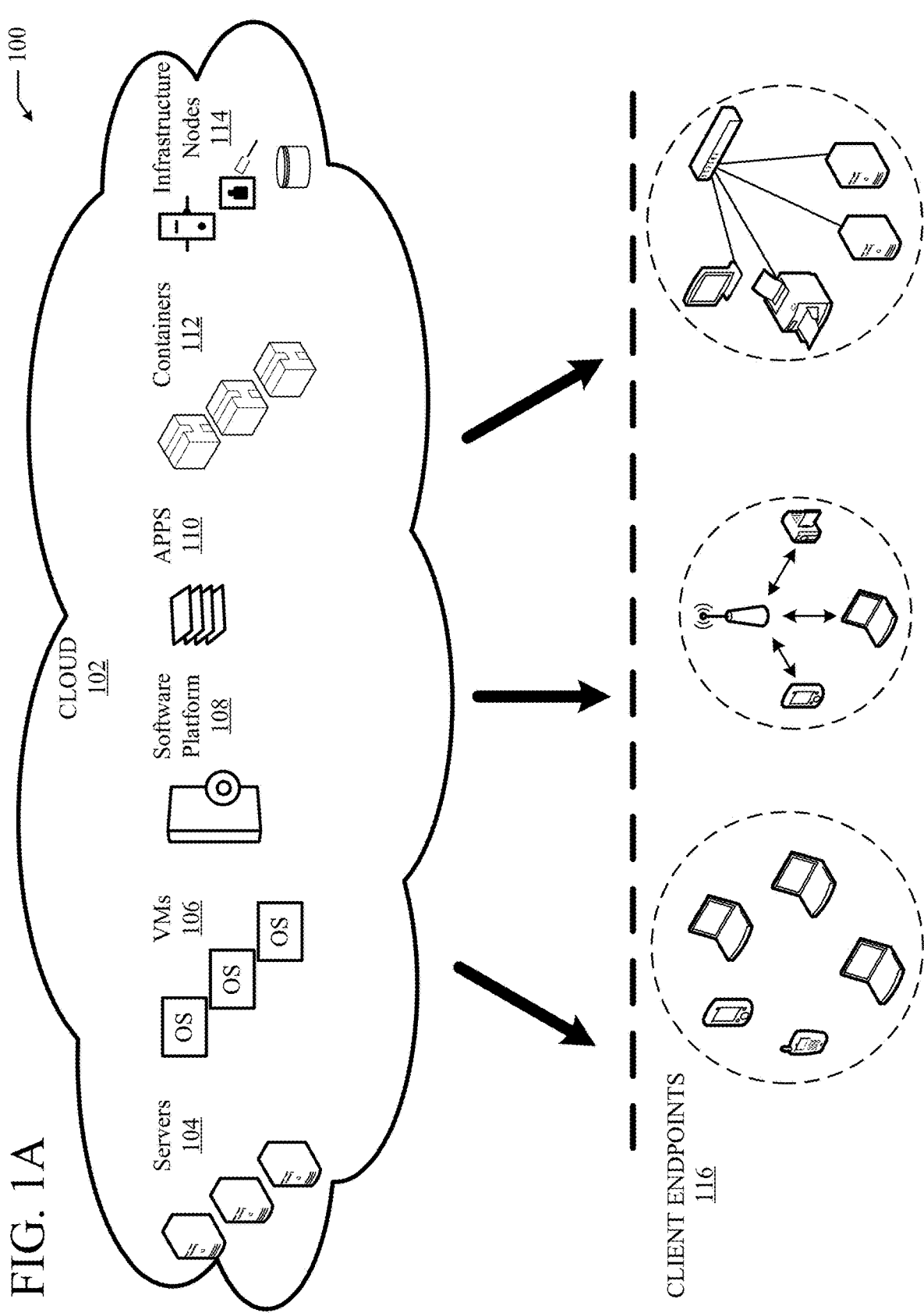
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving data at a primary node of a placement group in a network overlay of a distributed storage cluster. The data can be provided from the primary node to a first slave node of a plurality of slaves nodes within the placement group in an underlying network of the distributed storage cluster. Subsequently, the data can be replicated using the underlying network by providing the data directly from the first slave node in the underlying network to at least one other slave node of the plurality of slave nodes within the placement group in the underlying network.

A system can receive data at a primary node of a placement group in a network overlay of a distributed storage cluster. The system can provide the data from the primary node to a first slave node of a plurality of slave nodes within the placement group in an underlying network of the distributed storage cluster. Subsequently, the data can be replicated using the underlying network by providing the data to at least one other slave node of the plurality of slave nodes in the underlying network directly from the first slave node in the underlying network using multicasting.

A system can receive data at a primary node of a placement group in a network overlay of a distributed storage cluster. The system can provide the data from the primary node to a first slave node of a plurality of slave nodes within the placement group in an underlying network of the distributed storage cluster. Subsequently, the data can be replicated using the underlying network by providing the data to at least one other slave node of the plurality of slave nodes in the underlying network directly from the first slave node in the underlying network using multicasting. The at least one other slave node can provide an acknowledgement message indicating receipt of the data from the first slave node through the underlying network back to the primary node.

Description

The disclosed technology addresses the need in the art for efficient data replication in distributed storage systems. The present technology involves system, methods, and computer-readable media for controlling replication of data in a distributed storage cluster of a distributed storage system through an underlying network of the distributed storage cluster.

Figure 7:
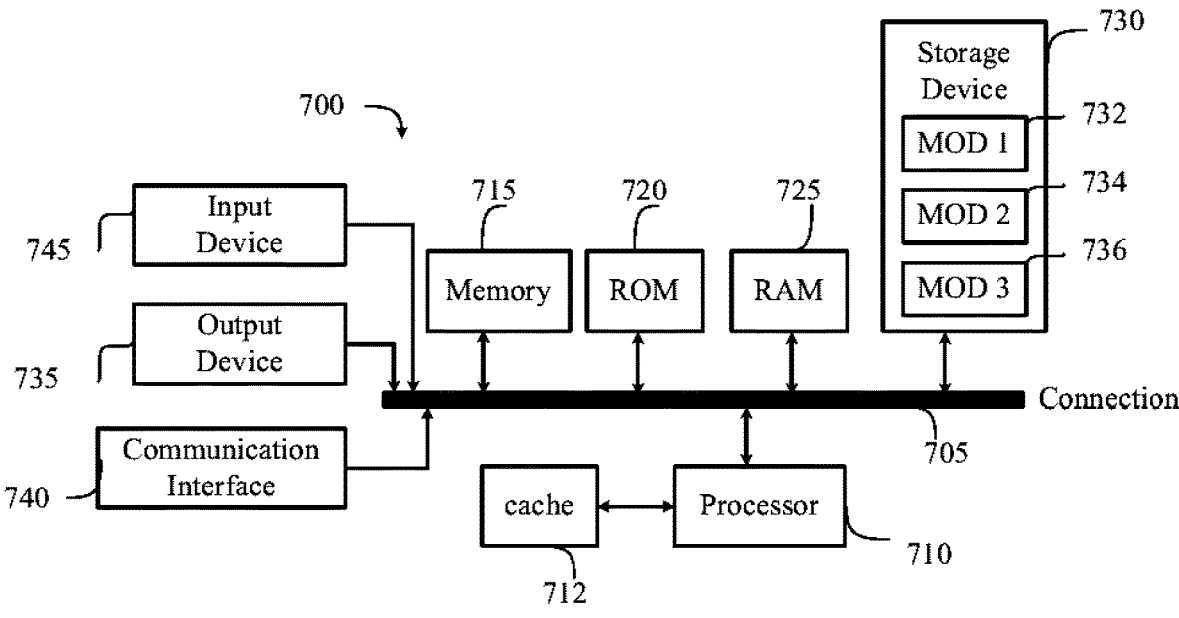
FIG. 7 illustrates an example computing system.

A description of network environments and architectures for network data access and services, as illustrated in FIGS. 1A, 1B, 2A, and 2B, is first disclosed herein. A discussion of systems and methods for using an underlying network to replicate data in distributed storage clusters, as shown in FIGS. 3, 4, 5, and 6, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
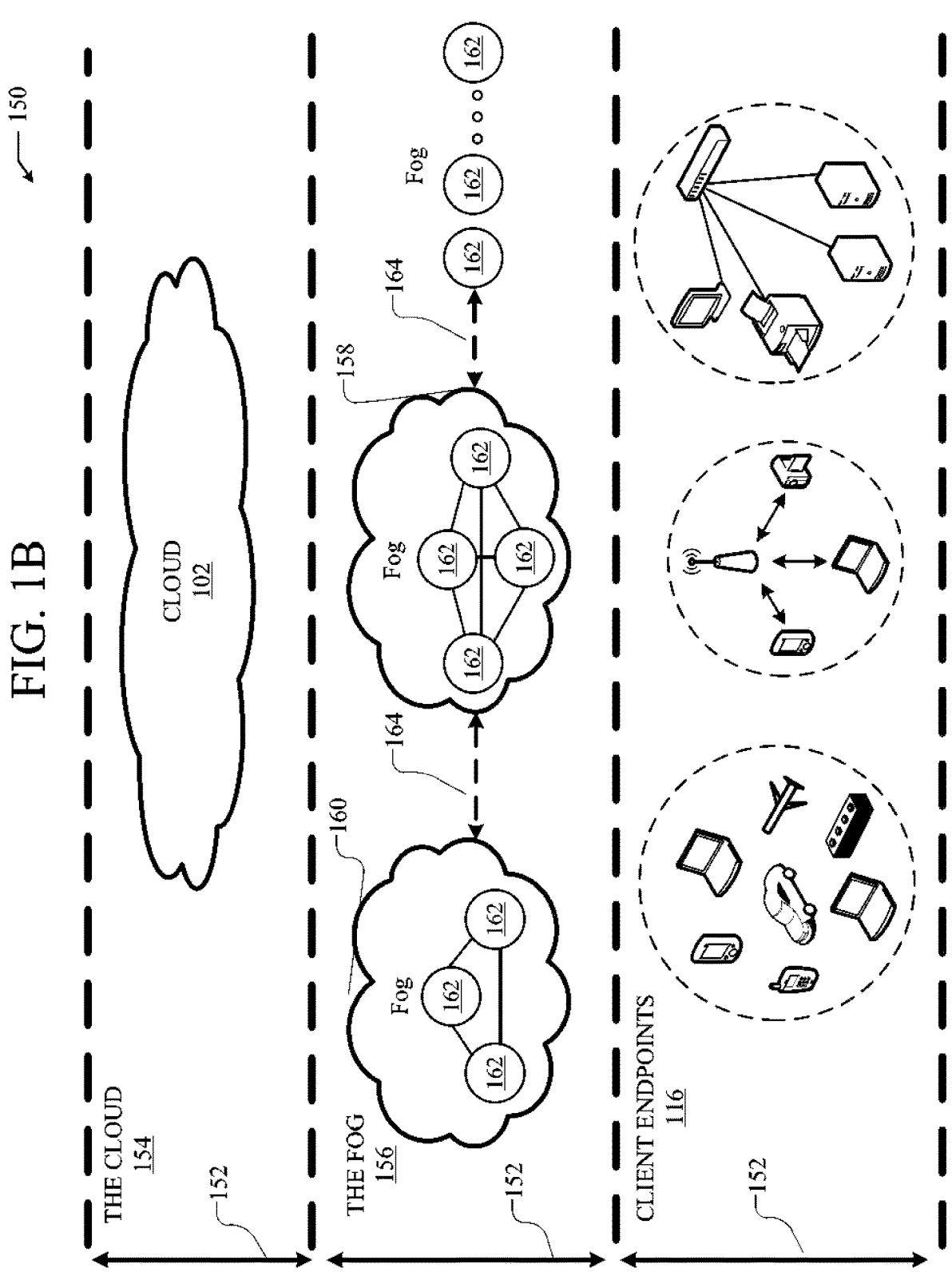
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
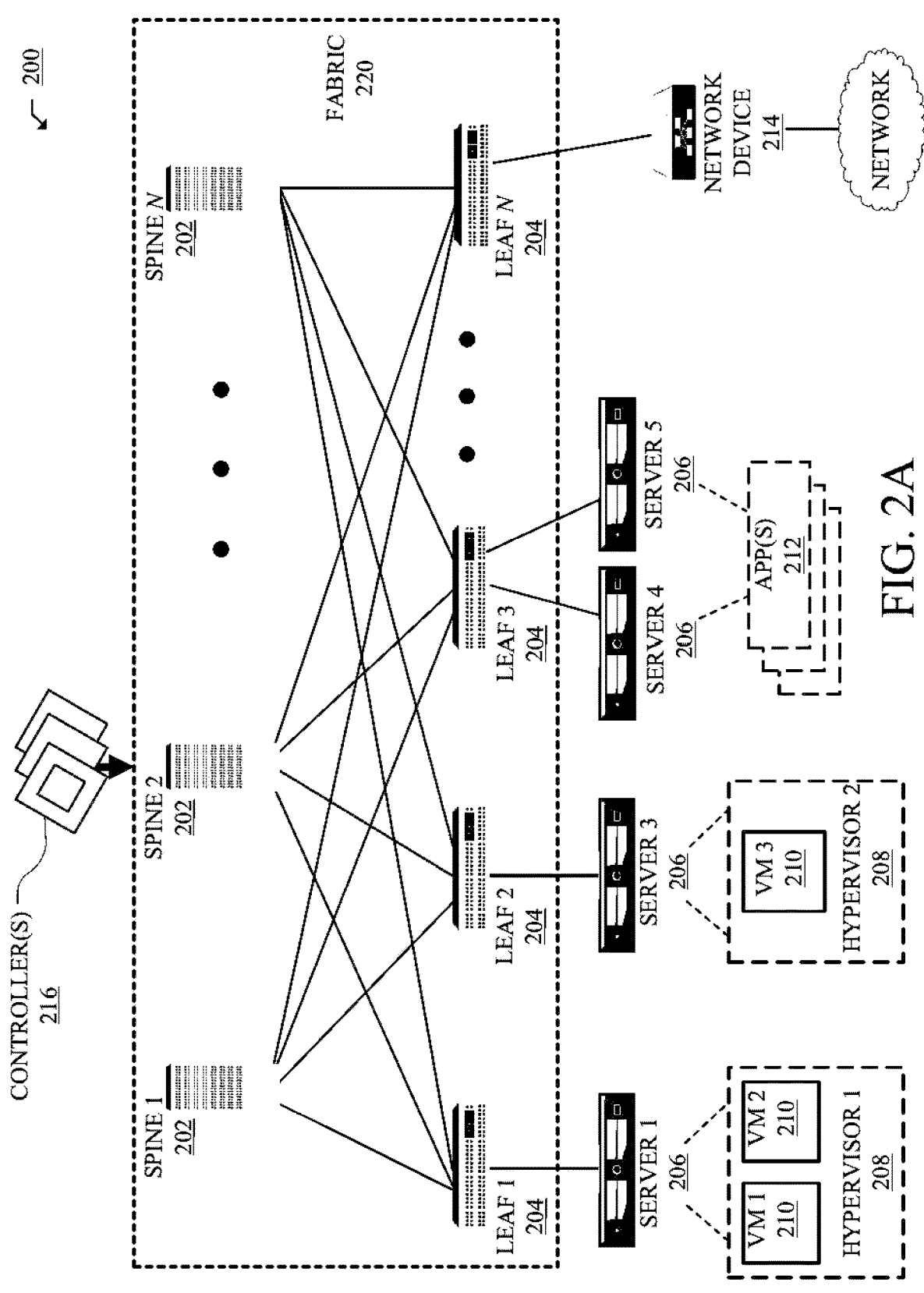
FIG. 2A illustrates a diagram of an example Network Environment.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
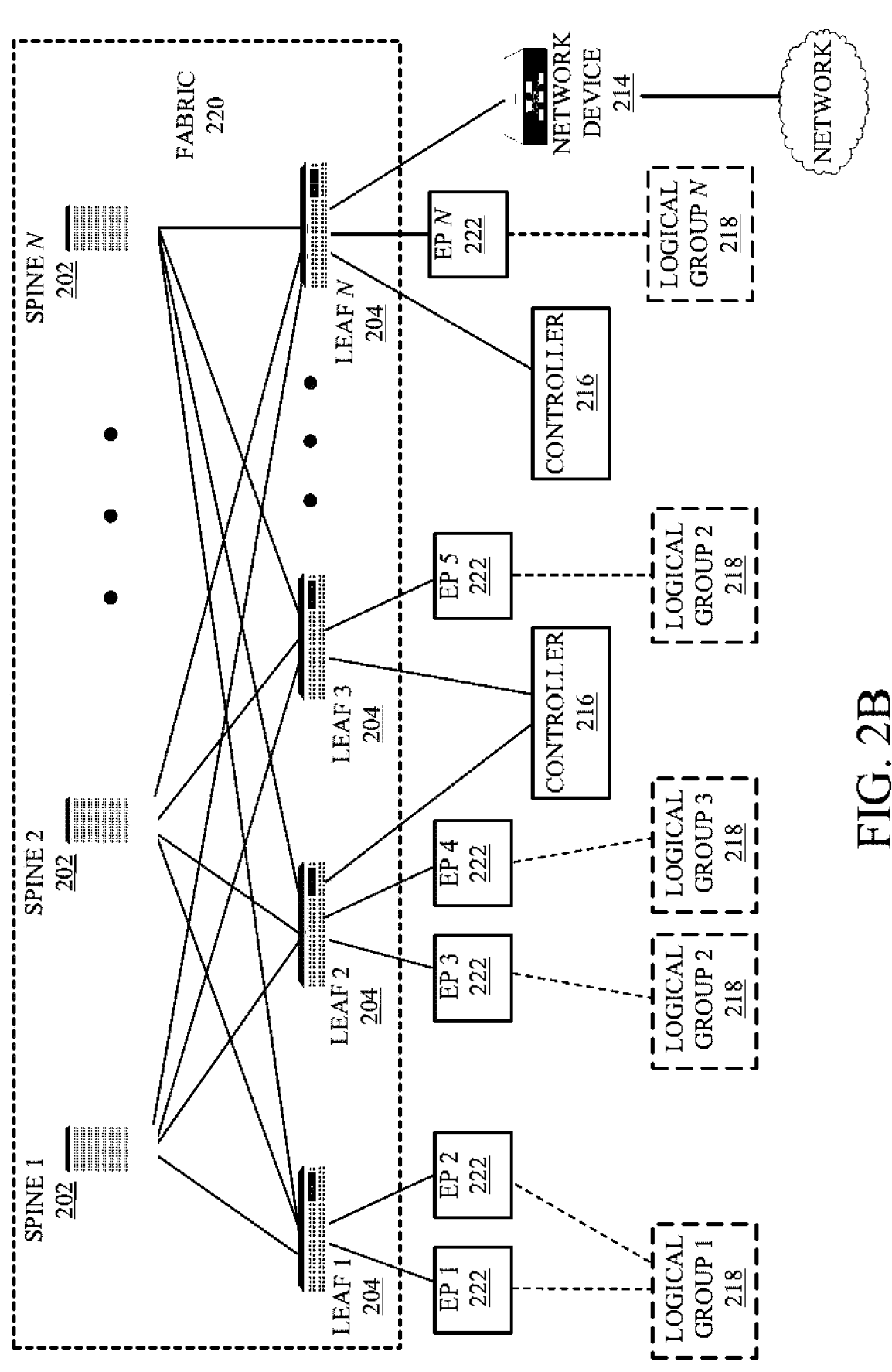
FIG. 2B illustrates another example of a Network Environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

The networks shown in FIGS. 2A and 2B can be used to implement, at least in part, a distributed data storage system. A distributed data storage system can include clusters of nodes, otherwise referred to as distributed storage clusters.

A distributed data storage system can be implemented as a distributed database. For example, a distributed data storage system can be implemented as a non-relational database that stores and accesses data as key-value pairs. Additionally, a distributed data storage system can be implemented across peer network data stores. For example, a distributed storage system can include peers acting as nodes within a distributed storage cluster that are connected and form the distributed storage cluster through an applicable network, such as the networks shown in FIGS. 2A and 2B.

A distributed storage system can replicate data stored within the system. Specifically, nodes within one or a plurality of clusters of nodes can store the same data, as part of replicating the data within the distributed data storage system. In replicating data, e.g. within a distributed storage cluster, a distribute data storage system can provide both increased fault tolerance and high availability of data. For example, in the event that one node storing data is unavailable, then another node storing the data can be used to provide or otherwise make the data accessible.

In typical distributed storage systems a network overlay of the distributed storage systems controls all or most aspects of replication of data within an underlying network of the distributed storage systems. In particular, data replication in current distributed data storage systems is controlled through source-based replication. In using source-based replication to replicate data, a primary node can communicate with each node to control data replication. In particular, a primary node can use unicast to communicate with each node as part of control data replication. Each node can then send back an acknowledgement indicating receipt of the data to the primary node, e.g. using unicast. This is an inefficient use of resources. Specifically, the primary node is burdened with originating all communications and transfers of data for purposes of replicating data.

Figure 3:
FIG. 3 depicts a placement group of a distributed storage cluster as part of a distributed storage system.

FIG. 3 depicts a placement group 300 of a distributed storage cluster as part of a distributed storage system. The placement group 300 shown in FIG. 3 is configured to use an underlying network of a distributed storage system to replicate data within the distributed storage system. In particular, the placement group 300 is configured to use an underlying network formed by slave nodes of the distributed storage system to replicate data within the placement group 300.

The placement group 300 shown in FIG. 3 includes a primary node 302 and an underlying network 304. The placement group 300 can be part of a distributed storage system, e.g. a distributed storage system implemented through the networks shown in FIGS. 2A and 2B. The primary node 302 can be included as part of a network overlay of a distributed storage cluster of a distributed storage system. For example, the primary node 302 can be part of a plurality of primary nodes in distributed storage clusters forming a network overlay for the distributed storage clusters. The primary node 302 can serve as a primary node for a plurality of placement groups, potentially simultaneously. For example, the primary node 302 can provide data to different placement groups for replication of data in the different placement groups.

The underlying network 304 includes a first slave node 306, a second slave node 308, and a third slave node 310. The second slave node 308 can be coupled to the primary node 302 through the first slave node 306. One or a combination of the primary node 302, the first slave node 306, the second slave node 308, and the third slave node 310 can be formed in the data link layer or layer 2 of a network environment in which the placement group 300 is implemented. Additionally, one or a combination of the primary node 302, the first slave node 306, the second slave node 308, and the third slave node 310 can be formed in the network layer or layer 3 of a network environment in which the placement group 300 is implemented.

The placement group 300 shown in FIG. 3 is configured to replicate data within the placement group 300 using the underlying network 304 instead of source-based replication. The primary node 302 can receive data to be replicated within the placement group 300. Further, the primary node 302 can provide the data to the underlying network 304, where subsequently the underlying network 304 can replicate the data using the single copy of the data received from the primary node 302. As part of using the underlying network 304 to replicate data instead of using source-based replication, the primary node 302 does not need to provide or otherwise can refrain from providing multiple copies of the data to the underlying network 304 corresponding to each time the data is replicated within the underlying network 304. This can lead to lower amounts of consumed network resources and improved speeds in actually replicating the data within the placement group 300.

As part of using the underlying network 304 to replicate data within the placement group 300, the primary node 302 can provide data only to the first slave node 306 as illustrated in FIG. 3. The primary node 302 can provide data to the first slave node 306 according to an IP multicast group or an IP multicast group mapping associated with the placement group 300. An IP multicast group mapping can include or otherwise be associated with a multicast tree of a plurality of slave nodes in the underlying network 304 and routes, potentially shortest paths, for communicating with the slave nodes in the underlying network 304. For example, an IP multicast group mapping for the placement group 300 can include the first slave node 306 and the second slave node 308 and an indication that the second slave node 308 is downstream from the first slave node 306. Additionally, an IP multicast group mapping can include a destination IP address associated with the IP multicast group mapping. In using an IP multicast group mapping to send data, the primary node 302 can set a destination IP address of the data as the IP multicast group address, and the data can subsequently be sent to the first slave node 306 as part of sending the data to the IP multicast group.

An IP multicast group can be uniquely associated with the placement group 300. In particular, an IP multicast group associated with the placement group 300 can only include nodes within the placement group 300. A node can belong to multiple IP multicast groups corresponding to different placement groups associated with the node. For example, the first slave node 306 can serve as a slave node for not only the placement group 300 shown in FIG. 3, but also for another placement group. As a result, the first slave node 306 can be included as part of an IP multicast group uniquely associated with the placement group 300 shown in FIG. 3 and another IP multicast group uniquely associated with the other placement group.

Nodes can be added to and removed from an IP multicast group. More specifically, nodes can be added to and removed from an IP multicast group as they are added to and removed from a placement group associated with the IP multicast group. For example, after the third slave node 310 is added to the placement group 300 it can subsequently subscribe to an IP multicast group associated with the placement group 300. Once a node subscribes to an IP multicast group, the node can be added to a multicast tree associated with the IP multicast group. For example, when the second slave node 308 joins an IP multicast group associated with the placement group 300, then the second slave node 308 can be added to a multicast tree to indicate the second slave node is downstream from the first slave node 306 as part of a shortest path to the second slave node 308.

A primary node of a placement group can refrain from subscribing to an IP multicast group associated with the placement group. As a result, an IP multicast group can be specific to an underlying network. For example, the primary node 302 can refrain from subscribing to an IP multicast group uniquely associated with the placement group 300 in order to maintain a multicast tree specific to one or a combination of the first slave node 306, the second slave node 308, and the third slave node 310 within the underlying network 304.

Nodes can subscribe to the IP multicast group using an applicable method of subscribing a node to a multicast group such as an applicable Internet Group Management Protocol (hereinafter referred to as "IGMP"), e.g. IGMPv3, IGMPv2, and IGMPPv1. Nodes can subscribe to an IP multicast group when the IP multicast group is created or otherwise associated with a placement group associated with the nodes. For example, the first slave node 306, the second slave node 308, and the third slave node 310 can subscribe to an IP multicast group associated with the placement group 300 after the placement group 300 is mapped to or otherwise associated with the IP multicast group.

In subscribing nodes to an IP multicast group, an IP multicast group mapping for the IP multicast group can be distributed to the nodes. An IP multicast group mapping for an IP multicast group can be distributed to nodes using source based replication. For example, the first slave node 306 and the second slave node 308 can receive an IP multicast group mapping as part of individual unicast transmissions sent from the primary node 302 to each of the first slave node 306 and the second slave node 308. A multicast group mapping used in subscribing nodes to an IP multicast group can be sent to the nodes using unicast transmissions. Subsequently, the nodes can subscribe an IP multicast group based on receipt of an IP multicast group mapping for the IP multicast group.

The primary node 302 can be configured to only send data to a slave node in the underlying network 304 that has downstream slave nodes. For example, the primary node 302 can send data to be replicated to the first slave node 306 because the first slave node 306 has a node downstream, the second slave node 308. Further in the example, the primary node 302 can refrain from sending the data to the third slave node 310 as the third slave node 310 lacks downstream nodes. In only sending data to a slave node in the underlying network 304 that has downstream slave nodes, the primary node 302 can ensure that data can be replicated across a plurality of slave nodes in the underlying network 304. Further, in only sending data to a slave node in the underlying network 304 that has downstream slave nodes, the primary node 302 only has to send the data once to the underlying network 304 for purposes of replicating the data in the underlying network 304. As a result, the primary node 302 can utilize fewer resources in replicating data in the underlying network 304 while potentially replicating the data in the underlying network 304 more quickly.

The first slave node 306 can receive data to be replicated in the underlying network 304 from the primary node 302. The first slave node 306 can receive data from the primary node 302, potentially as part of a multicasting to an IP multicast group associated with the placement group 300 and including the first slave node 306. The first slave node 306 can locally store the data received from the primary node 302 at the first slave node 306. Subsequently, the first slave node 306 can send the data to the second slave node 308 where the data can be save locally as part of replicating the data in the underlying network. The first slave node 306 can send data to the second slave node 308 using network broadcasting. More specifically, the first slave node 306 and the second slave node can be implemented in a data link layer of a distributed storage system and subsequently use network broadcasting to communicate and exchange data with each other.

The first slave node 306 can send data to the second slave node 308 as part of a multicast message. Further, the first slave node 306 can send data to the second slave node 308 using a multicast tree included as part of an IP multicast group mapping for an IP multicast group including the first slave node 306 and the second slave node 308. For example, the first slave node 306 can use a multicast tree to identify that the second slave node 308 is downstream from the first slave node 306, and subsequently send the data to the second slave node 308.

Both the first slave node 306 and the second slave node 308 can send an acknowledgement message indicating receipt of data to be replicated in the underlying network 304. More specifically, the first slave node 306 can send an acknowledgment message after receiving data from the primary node 302 and the second slave node 308 can send an acknowledgment message after receiving data from the first slave node 306. The first slave node 306 and the second slave node 308 can send acknowledgment messages indicating receipt of data back to the primary node 302. The acknowledgment message sent back to the primary node 302 from the first slave node 306 and the second slave node 308 can each be sent as unicast messages.

Any one of the slave nodes in the underlying network 304 can be implemented through routers configured to communicate using source specific multicast (hereinafter referred to as "SSM"). In using SSM to communicate, slave nodes in the underlying network 304 can receive data directly from the source, e.g. the primary node 302. More specifically, slave nodes in the underlying network 304 can receive data directly from a source instead of receiving the data from a rendezvous point. This can further reduce an amount of network resources used in replicating data in the underlying network 304 while potentially increasing speeds at which the data is replicated in the underlying network 304.

FIG. 4 depicts an example underlying network-based data replication system 400. The underlying network-based data replication system 400 can replicate data received from a primary node of a placement group using an underlying network of the placement group. In replicating data using an underlying network, the underlying network-based data replication system 400 eliminates the need for a primary node to replicate data in a placement group using source-based data replication. More specifically, by replicating data using an underlying network, the underlying network-based data replication system 400 eliminates the need for a primary node to send data multiple times to an underlying network, e.g. through multiple unicast messages, in order to replicate the data in the underlying network.

The underlying network-based data replication system 400 shown in FIG. 4 can be implemented at one or a combination of slave nodes in an underlying network, e.g. the first slave node 306 in the underlying network 304 of the placement group 300 shown in FIG. 3. Additionally, the underlying network-based data replication system 400 can be implemented at a primary node of a placement group 300, e.g. the primary node 302 of the placement group shown in FIG. 3. Further, the underlying network-based data replication system 400 can be implemented, at least in part, at a remote system, e.g. in the cloud.

The underlying network-based data replication system 400 shown in FIG. 4 includes a multicast group mapper 402, a multicast group storage 404, a data replicator 406, a data receipt acknowledger 408. The multicast group mapper 402 can manage an IP multicast group of a placement group for purposes of controlling data replication in an underlying network of the placement group. Specifically, the multicast group mapper 402 can map or otherwise uniquely associate an IP multicast group with a placement group. In being uniquely associated with an IP multicast group, each placement group of a plurality of placement groups can be associated with a different IP multicast group. This allows for controlled data replication within specific placement groups using IP multicast groups.

In response to mapping an IP multicast group to a placement group or vice versa, the multicast group mapper 402 can facilitate subscription of all or a subset of slave nodes in the placement group to the IP multicast group. Specifically, the multicast group mapper 402 can send a mapping of an IP multicast group to a placement group to all or a subset of nodes, e.g. slave nodes, in the placement group. The multicast group mapper 402 can send a mapping of an IP multicast group to a placement group through unicast messages, e.g. source based replication, to corresponding nodes in the placement group. In response to receiving a mapping of an IP multicast group to a placement group, nodes in the placement group can subsequently subscribe to the IP multicast group using the multicast group mapper. Specifically, the nodes can use an applicable IGMP method for subscribing to an IP multicast group through the multicast group mapper 402.

The multicast group mapper 402 can add nodes to an IP multicast group mapped to a placement group, as nodes are added to the placement group. Specifically, when a node joins a placement group, the multicast group mapper 402 can send a mapping of an IP multicast group uniquely associated with the placement group to the newly joined node. The newly joined node can subsequently subscribe to the IP multicast group through the multicast group mapper 402.

In mapping an IP multicast group to a placement group, the multicast group mapper 402 can maintain an IP multicast group mapping for the IP multicast group, as indicated by multicast group data stored in the multicast group storage 404. Specifically, the multicast group mapper 402 can maintain a mapping including all nodes in a placement group, e.g. identifiers or addresses of the nodes, that are subscribed to an IP multicast group and an address of the IP multicast group. Additionally, the multicast group mapper 402 can maintain a multicast tree, as part of an IP multicast group mapping, indicating network or connectivity relationships between nodes that have subscribed to an IP multicast group. For example, the multicast group mapper 402 can maintain a multicast tree indicating which slave nodes in a placement group are downstream from other slave nodes in the placement group.

The data replicator 406 can receive and transmit data for replication within a placement group using an underlying network. The data replicator 406 can be implemented at one or a plurality of slave nodes in an underlying network and receive data to be replicated in a placement group from a primary node of the placement group. The data replicator 406 can receive data to be replicated from a primary node as either a unicast transmissions or multicasting. For example, the data replicator 406 can be implemented at a first slave node in an underlying network and can receive data through a multicasting addressed to an IP multicast group including the first slave node.

The data replicator 406 can propagate received data through an underlying network by providing received data to other slave nodes in the underlying network, effectively replicating the data in the underlying network. The data replicator 406 can transmit data to other slave nodes in the underlying network as part of multicasting. Additionally, the data replicator 406 can use an IP multicast group mapping, e.g. as indicated by multicast group data stored in the multicast group storage 404, to send data to other slave nodes in an underlying network as part of multicasting. For example, the data replicator can use a multicast tree for an IP multicast group to send received data to other downstream slave nodes in the IP multicast group. As the data replicator 406 can propagate received data through an underlying network to replicate the data through the underlying network, a primary node only has to provide the data to data replicator 406 once in order to replicate the data in the underlying network. This reduces an amount of network resources used in replicating the data and can potentially lead to faster replication times for the data.

The data receipt acknowledger 408 can send acknowledgements of receipt of data at various slave nodes in the underlying network. Specifically, the data receipt acknowledger 408 can be implemented at slave nodes in an underlying network and be configured to provide an acknowledgment when data to be replicated in the underlying network is received at the slave nodes. For example, the data receipt acknowledger 408 can provide an acknowledgment when data is received at a slave node through multicasting from another slave node in an underlying network, as part of replicating the data in the underlying network. The data receipt acknowledger 408 can send acknowledgements of receipt of data at various slave nodes back to a primary node for a placement group. More specifically, the data receipt acknowledger 408 can send the acknowledgement back to the primary node through unicast transmissions. As a result, each acknowledgement can correspond to a single slave node and indicate each slave node that has received data as part of replicating data through an underlying network.

FIG. 5 illustrates a flowchart for an example method of replicating data in a placement group of a distributed storage system using an underlying network of the distributed storage system. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

Each module shown in FIG. 5 represents one or more steps, processes, methods or routines in the method. For the sake of clarity and explanation purposes, the modules in FIG. 5 are described with reference to the placement group 300 shown in FIG. 3 and the underlying network-based data replication system 400 shown in FIG. 4.

At step 500, a primary node of a placement group in a network overlay of a distributed storage cluster received data to be replicated in the distributed storage cluster. The placement group can be included as part of a plurality of distributed storage clusters that form part of a distributed storage system. Additionally, a placement group including a primary node can be implemented using a network environment as shown in FIGS. 2A and 2B.

At step 502, the data is provided from the primary node to a first slave node of a plurality of slave nodes within the placement group in an underlying network of the distributed storage cluster. A data replicator 406 can receive the data at a first slave node of a plurality of slave nodes within the placement group in an underlying network of the distributed storage cluster. The data can be provided from the primary node to a first slave node of a plurality of slave nodes within the placement group as part of multicasting. For example, the primary node can set a destination address of a multicast transmission including the data as an address of a multicast group of the placement group.

At step 504, the data replicator 406 replicates the data using the underlying network by providing the data to at least one other slave node of the plurality of slave nodes within the placement group in the underlying network directly from the first slave node in the underlying network. In providing the data using the underlying network to at least one other slave node of the plurality of slave nodes in the underlying network, the primary node only has to provide the data once to the underlying network. Accordingly network resource usage in replicating the data can be reduced and an increase in speed in replicating the data can be achieved.

FIG. 6 illustrates a flowchart for an example method of replicating data in a placement group of a distributed storage system through multicast messaging using an underlying network of the distributed storage system. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

Each module shown in FIG. 6 represents one or more steps, processes, methods or routines in the method. For the sake of clarity and explanation purposes, the modules in FIG. 6 are described with reference to the placement group 300 shown in FIG. 3 and the underlying network-based data replication system 400 shown in FIG. 4.

At step 600, the multicast group mapper 402 maps a placement group in an underlying network of a distributed storage cluster to a unique IP multicast group to create an IP multicast group mapping. As part of mapping a placement group to a unique IP multicast group, nodes within the placement group can subscribe to the IP multicast group. Specifically, a mapping of a placement group to a unique IP multicast group can be provided to slave nodes in the placement group who can subsequently subscribe to the IP multicast group. In mapping a placement group to a unique IP multicast group, a multicast tree for the unique IP multicast group can be maintained. More specifically, a multicast tree indicating slave nodes downstream from other slave nodes in an IP multicast group can be maintained as slave nodes subscribe to the IP multicast group.

At step 602, a primary node of the placement group in a network overlay of a distributed storage cluster received data to be replicated in the distributed storage cluster. The placement group can be included as part of a plurality of distributed storage clusters that form part of a distributed storage system. Additionally, the placement group including a primary node can be implemented using a network environment as shown in FIGS. 2A and 2B.

At step 604, the data is provided from the primary node to a first slave node of the plurality of slave nodes within the placement group in an underlying network of the distributed storage cluster. A data replicator 406 can receive the data at a first slave node of the plurality of slave nodes within the placement group in an underlying network of the distributed storage cluster. The data can be provided from the primary node to a first slave node of the plurality of slave nodes within the placement group as part of multicasting. For example, the primary node can set a destination address of a multicast transmission including the data as an address of the IP multicast group of the placement group.

At step 606, the data replicator 406 replicates the data using the underlying network by providing the data to at least one other slave node of the plurality of slave nodes within the placement group in the underlying network directly from the first slave node in the underlying network according to the IP multicast group mapping. The data can be provided at least one other slave node using a multicast tree included as part of the IP multicast group mapping. For example, the data can be provided to slave nodes downstream from the first slave node using a multicast tree included as part of the IP multicast group mapping.

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output.

There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving ingress data for replication at a primary node of a distributed storage cluster defined in an overlay network;
   maintaining a multicast tree for a unique IP multicast group, the multicast group corresponding to a placement group in the distributed storage cluster, the multicast group including a plurality of nodes;
   setting a destination Internet Protocol (IP) address as the multicast group address;
   dynamically selecting a first node from the plurality of nodes to act as a replication source;
   sending the data from the primary node to the selected first node using the destination IP address; and
   replicating the data from the selected first node to a second node within the placement group via multicasting over an underlying network of the distributed storage cluster.

2. The method of claim 1, further comprising: configuring the first node to be part of a second multicast group.

3. The method of claim 1, further comprising saving a replica of the data at the first node and saving a replica of the data at the second node.

4. The method of claim 1, wherein the second node is configured to send an acknowledgement message back to the primary node indicating receipt of the data.

5. The method of claim 4, wherein the acknowledgement message is sent via a unicast transmission.

6. The method of claim 1, wherein the primary node is configured to send only a single copy of the data to the first node, and wherein the primary node does not send a second copy of the data to the second node.

7. The method of claim 1, wherein the data is sent from the primary node to the first node using source specific multicast (SSM).

8. The method of claim 1, wherein the primary node does not subscribe to the IP multicast group associated with the placement group.

9. A system comprising:
   one or more processors; and
   at least one non-transitory computer-readable storage medium having stored therein instructions which, when executed by the one or more processors, cause the one or more processors to perform operations comprising:

receiving ingress data for replication at a primary node of a distributed storage cluster defined in an overlay network;

maintaining a multicast tree for a unique IP multicast group, the multicast group corresponding to a placement group in the distributed storage cluster, the multicast group including a plurality of nodes;

setting a destination IP address as the multicast group address;

dynamically selecting a first node from the plurality of nodes to act as a replication source;

sending the data from the primary node to the selected first node using the destination IP address; and replicating the data from the selected first node to a second node within the placement group via multicasting over an underlying network of the distributed storage cluster.

10. The system of claim 9, further comprising instructions which, when executed by the one or more processors, cause the one or more processors to perform the operation of configuring the first node to be part of a second multicast group.

11. The system of claim 9, further comprising instructions which, when executed by the one or more processors, cause the one or more processors to perform the operations of saving a replica of the data at the first node and saving a replica of the data at the second node.

12. The system of claim 9, wherein the second node is configured to send an acknowledgement message back to the primary node indicating receipt of the data.

13. The system of claim 12, wherein the acknowledgement message is sent via a unicast transmission.

14. The system of claim 9, wherein the primary node is configured to send only a single copy of the data to the first node, and wherein the primary node does not send a second copy of the data to the second node.

15. The system of claim 9, wherein the data is sent from the primary node to the first node using source specific multicast (SSM).

16. The system of claim 9 wherein the primary node does not subscribe to the IP multicast group associated with the placement group.

17. A non-transitory computer-readable medium including instructions which, when executed by one or more processors on one or more hosts, cause the one or more processors to perform operations comprising:

receiving ingress data for replication at a primary node of a distributed storage cluster defined in an overlay network;

maintaining a multicast tree for a unique IP multicast group, the multicast group corresponding to a placement group in the distributed storage cluster, the multicast group including a plurality of nodes;

setting a destination IP address as the multicast group address;

dynamically selecting a first node from the plurality of nodes to act as a replication source;

sending the data from the primary node to the selected first node using the destination IP address; and replicating the data from the selected first node to a second node within the placement group via multicasting over an underlying network of the distributed storage cluster.

18. The non-transitory computer-readable medium of claim 17, including instructions which, when executed by the one or more processors, cause the one or more processors to perform the operation of configuring the first node to be part of a second multicast group.

19. The non-transitory computer-readable medium of claim 17, further comprising instructions which, when executed by the one or more processors, cause the one or more processors to perform the operations of saving a replica of the data at the first node and saving a replica of the data at the second node.

20. The non-transitory computer-readable medium of claim 17, the data is sent from the primary node to the first node using source specific multicast (SSM).

* * * * *